3,157,694
METHOD FOR MAKING BISPHOSPHINIC
ACID COMPOUNDS
Harold James Harwood, Cuyahoga Falls, Ohio, assignor to Monsanto Company, a corporation of Delaware
No Drawing. Filed Nov. 7, 1960, Ser. No. 67,510
5 Claims. (Cl. 260—500)

This invention is directed to the preparation of organic phosphorous compounds. More particularly this invention is directed to an improved method for preparing bisphosphinic acid compounds.

It is an object of this invention to provide a process for preparing bisphosphinic acid compounds. It is a further object of this invention to provide an improved process whereby bisphosphinic acid compounds, their salts, and esters, may be obtained as the principal product of the reaction, which product is easily separated from the reaction medium and by-product materials.

In general, this invention is directed to a method for preparing organic phosphorous acids having the formula

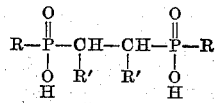

wherein R is a hydrocarbyl radical free from non-benzenoid unsaturation and containing from 1 to 8 carbon atoms, and R' is a radical free from non-benzenoid unsaturation containing hydrogen, less than 7 carbon atoms, and less than two oxygen atoms, and salts, and esters of such acids. These compounds may be named generally as bisphosphinic acid compounds. However, a specific example of such an acid compound may be named ethylene-1,2-bis(phenylphosphinic acid), and example of an ester of this being ethylene-1,2-bis(ethyl phenylphosphinate), and an example of a salt thereof being the disodium salt of ethylene-1,2-bis(phenylphosphinic acid).

These compounds may be prepared, according to the method of this invention, by reacting a cyclic phosphonite esters of the formula

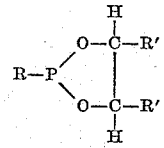

wherein R and R' are as defined above with a catalyst selected from the group consisting of alkyl halides having from 1 to 6 carbon atoms in the alkyl radical, and halogen-containing Friedel-Crafts catalysts, to form a polymeric material, and then hydrolyzing this resulting polymeric material to obtain the respective bisphosphinic acid compounds. Salts and esters of these bisphosphinic acid compounds may be prepared by neutralization or esterfication methods well known in the art.

The cyclic phosphonite esters of the above given formula which are used as starting materials to produce the compounds prepared by the method of this invention may be prepared, for example, by reacting a phosphorous dihalide compound of the formula

R—PX$_2$ where R is as defined above with a glycol compound of the formula

wherein R' is as above defined, in the presence of an acid acceptor substance such as a tertiary amine, in a non-aqueous diluent, such as benezene, hexane, dioxane, etc.

Examples of compounds resulting from such a reaction are: 2-methyl-, 2-ethyl-, 2-isopropyl-, 2-amyl-, 2-hexyl-, 2-(2-ethylhexyl)-, 2-octyl-, 2-cyclopentyl-, 2-cyclohexyl-, 2-(p-tolyl)-, 2-(2,4-xylyl-, 1,3,2-dioxaphospholane. Additional examples of such compounds are those having alkyl substituents in the ethylene chain of the phospholane ring, e.g., 2 - ethyl - 4-methyl-1,3,2-dioxaphospholane, 2-phenyl - 4,5 - diethyl-1,3,2-dioxaphospholane, 2-hexyl-4-butyl - 5-ethyl-1,3,2-dioxaphospholane, 2-cyclohexyl-1,2-dioxaphospholane, 2-(p-tolyl) - 4,5-diamyl - 1,3,2-dioxaphospholane. Phosphonite cyclic esters having ether linkage substituents in the alkylene chain of the phospholane may also be used, examples of which are: 2-butyl-4-(4-methoxybutyl)-1,3,2-dioxaphospholane, 2-phenyl-4,5-bis-(3-methoxypropyl)-1,3,2-dioxaphospholane, 2-phenyl-4-(2-methoxyethyl)-1,3,2-dioxaphospholane, 2-cyclopentyl-4-(4-methoxyphenyl) - 5-methyl-1,3,2-dioxaphospholane, 2-octyl-4 - (3-ethoxypropyl) - 1,3,2-dioxaphospholane, 2-(2,4-xylyl)-4-(2-phenoxyethyl)-1,3,2-dioxaphospholane.

Compounds of the above formula form the subject matter of my copending application Serial No. 67,505, filed November 7, 1960, which is incorporated herein by reference.

Catalysts useful for the purpose of the process of this invention are halogen-containing catalysts selected from the group consisting of alkyl halides having from 1 to 6 carbon atoms in the alkyl group and halogen-containing Friedel-Crafts catalysts. Examples of alkyl halide catalysts which may be used are methyl iodide, ethyl bromide, 1,2-dibromoethane, 1,4-dibromohexane, 1,6-dibromohexane, etc. Preferred catalysts, however, for the purpose of this invention are the Friedel-Crafts catalysts, such as the chlorides, bromides or fluorides of aluminum, tin, zinc, magnesium, iron, titanium, bismuth, antimony, and of boron, etc.

In carrying out the presently provided process, the cyclic phosphonite ester is contacted with the alkyl halide or halogen-containing Friedel-Crafts catalyst, preferably at an elevated temperature, until formation of the polymeric material has occurred. Completion of the reaction can readily be determined by noting cessation of change in refractive index, specific viscosity, etc. Amounts of catalyst used to carry out the reaction may be, e.g., from 0.1% or less to 3.0% or more of the weight of the cyclic phosphonite ester starting material. The presence of water should be avoided since the cyclic phosphonite ester is sensitive to hydrolysis. Advantageously, temperatures on the order of from about 100° C. to 180° C. are applied to accelerate the reaction, although temperatures on the order of from about 20° to 200° C. may be used. Conveniently, the polymerization may be carried out under pressure, so as to avoid loss of reactants, though it is not excluded to work at atmospheric pressure. Thus, for example, pressures of from 1 up to 500 atmospheres or above may be applied during the polymerization.

It has been found by infrared analysis that the polymeric material resulting from the reaction of a cyclic phosphonite ester of the above type with a catalyst contains a P=O bond linkage indicating that the ring-opening reaction involves molecular rearrangement. The product does not have the structure expected for a polymer obtained by ring-opening reaction accompanied by Arbuzov rearrangement, however. If the polymer were of the expected molecular structure it would have the structural formula

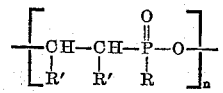

wherein *n* is a large number and R and R' are as above defined. This polymer upon hydrolysis would yield a pentavalent phosphorous acid having the formula

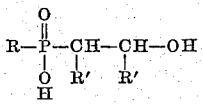

wherein R and R' are as above defined. However, contrary to what is expected, it has been found, according to this invention, that when a cyclic phosphonite ester of the above type is reacted with a catalyst to form a polymer, and then this resulting polymer is hydrolyzed to degrade the polymer to monomeric units, bisphosphinic acid compounds are formed. This is indeed surprising, since such bisphosphinic acid compounds have been produced previously by other methods only in insignificant yields, and then only in admixture with other phosphorus compounds.

Following the polymerization reaction, the resinous polymer is hydrolyzed with an aqueous medium which may be in the gaseous, liquid, or even solid form as an acidic, neutral, or basic pH water-containing system. Atmospheric moisture will be sufficient in some cases to effect the hydrolysis of the polymer. Heating of the polymeric material with an aqueous acidic or alkaline solution at reflux for some time will ordinarily be advantageous to effect rapid hydrolysis and degradation of the polymeric material. Since the polymeric material is quite sensitive to moisture, the hydrolysis may be effected using small quantities of the aqueous medium, although, ordinarily excess aqueous solutions are used. Examples of acidic media that may be used to effect the hydrolysis of the polymer are solutions, preferably dilute, of hydrochloric, sulfuric, phosphoric, formic, acetic, propionic, etc, acids. Alkaline solutions useful for effecting hydrolysis of the polymer include those of alkali metal hydroxides, e.g., sodium hydroxide, potassium hydroxide, as well as other well known alkaline medias, such as, sodium bicarbonate, ammonium hydroxide, calcium hydroxide, etc. Aqueous alcoholic solutions are likewise useful for effecting hydrolysis of the polymer. Examples of these are aqueous solutions of methanol, ethanol, propanol, 2-ethylhexanol, phenol, etc. Depending upon the aqueous solution chosen for the hydrolysis reaction, the resulting product, i.e., the R'' group thereof will be in the free acid or salt form. Esters may be prepared by treating the bisphosphinic acid compound with the appropriate alcohol according to conventional techniques.

The hydrolyzed product, in acidic, salt or ester form, obtained as above, may be recovered as such, or be further purified. For example, when acid hydrolysis techniques are used, the product may be purified by dissolving the material in a weakly basic aqueous medium and then acidifying the solution to precipitate the more pure acid product. Similarly, a salt product obtained by alkaline hydrolysis may be purified by acidifying the alkaline solution to obtain the solid acid, and re-precipitating the product as indicated above. The process may be carried out in continuous fashion by suitable change of equipment, or may be operated in batch fashion.

Examples of bisphosphinic acids of the above type, their salts and ethers prepared as indicated above are:

Ethylene-1,2-bis(ethylphosphinic acid),
1-methylethylene-1,2-bis(cyclohexylphosphinic acid),
1,2-bis(3-methoxypropyl)ethylene-1,2-bis(phenylphosphinic acid),
Dipotassium salt of 1-(methoxyphenyl)ethylene-1,2-bis(isopropylphosphinic acid),
Diammonium salt of 1,2-diethylethylene-1,2-bis(cyclopentylphosphinic acid),
Disodium salt of 1-(4-methoxyphenyl)ethylene-1,2-bis(p-tolylphosphinic acid),
Ethylene-1,2-bis(ethyl phenylphosphinate),
1,2-bis(2-ethoxyethyl)ethylene - 1,2-bis(isopropyl ethylphosphinate),
1-phenylethylene-1,2-bis(phenyl phenylphosphinate).

The bisphosphinic acid compounds have many industrial uses. These acids, especially as heavy salts, e.g., the zinc and lead salts, are useful as extreme pressure oil additives. These bis-phosphinic acid compounds or the water-soluble salts thereof, for example, sodium salt, may be used as heavy metal extraction agents from acid solutions, for example, gold, bismuth, thorium, and uranium from nitric and hydrochloric acid solutions. The higher esters of these acids, e.g., the 2-ethylhexyl and dodecyl esters, are useful as plasticizers in resin compositions.

*Example 1*

2-phenyl-1,3,2-dioxaphospholane

was prepared as follows. Solutions of ethylene glycol (31 g.) in 100 ml. of pyridine and phenylphosphonous dichloride (68 g.) in 200 ml. of benzene were slowly added to a solution of 20 ml. of pyridine in benzene at 10–20° C. over a period of one-half hour and the mixture was then stirred for one-half hour longer. Precipitated pyridine hydrochloride was removed by filtration and washed with fresh benzene. The filtrates were concentrated on a water bath and the residue distilled. The viscous product (B.P. 80.5–82.0° C./1.8 mm., $n_D^{25}$ 1.5849–1.5919) weighed 24 g. Infrared (IR) analysis indicated the absence of C—OH and P=O contaminants after three weeks storage in a desiccator. This material is very sensitive to moisture.

The following procedure was used to effect the polymerization of the starting materials in this and in the subsequent examples. A Carius tube was weighed and flushed with dry nitrogen for fifteen minutes. The tube was then charged with monomers and catalyst from pre-weighed containers and sealed. The tube was then placed in the Carius oven for the required time, cooled and opened. The products could generally be poured from the tubes but on occasion they were either scraped out or dissolved in a suitable solvent, and the solvent later was evaporated.

A mixture of 9.5 g. of 2-phenyl-1,3,2-dioxaphospholane and 111 mg. of aluminum chloride was thus heated in a Carius tube at 160° C. for 65 hours. The product obtained was a hard colorless polymer, soluble in chloroform but insoluble in benzene. The polymer softened at 60–80° C., had a molecular weight of 695 (Rast method). This material swelled in water forming an acidic solution and an acidic oil. The acid obtained by hydrolysis was identified as ethylene-1,2-bis(phenylphosphinic acid).

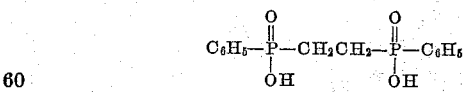

*Example 2*

A few drops of methyl iodide were mixed with 2-phenyl-1,3,2-dioxaphospholane (13.6 g.) and the mixture heated in a nitrogen atmosphere at 150° C. for 1.5 hours. The dark brown and very viscous mixture was treated with 2 drops of 1,6-dibromohexane and heating contined at 150° C. for 3 hours. The product was a brown, tacky but hard resin-like substance. On standing, it slowly crystallized. A solid acid, 4.3 g., M.P. 220–240° C. was isolated from the mixture by dissolving the material in acetone and ethanol. Additional material, 3.3 g. M.P. 220–237° C., was obtained by refluxing the alcohol and acetone extracts with dilute sodium hydroxide solution for several hours, and acidifying. The total yield of this acid was 7.6 g. It was shown by infrared analysis to be identical with the acids obtained from the hydrolysis of the resin formed by heating 2-phenyl-1,3,2-dioxaphospholane with aluminum chloride and identified as ethylene-1,2-bis(phenylphosphinic acid). The acid was purified by recrystallization from acetic acid yielding glistening plates, M.P. 266–267.5° C.

*Example 3*

1,2-dimethylethylene-1,2-bis(ethylphosphinic acid), can be prepared in a similar manner. Thus, employing the procedure of Example 1, but replacing the phenylphosphonous dichloride with an equimolar proportion of ethylphosphonous dichloride, and replacing the ethylene glycol with an equimolar proportion of 2,3-butanediol, and heating this mixture in the presence of the aluminum chloride catalyst to obtain a polymeric material, there is obtained upon hydrolysis of the resulting polymer the desired acid, 1,2-dimethylethylene-1,2-bis(ethylphosphinic acid), a salt or an ester thereof, depending upon the hydrolyzing medium chosen.

Other modifications and variations of the present invention will be obvious to those skilled in the art.

I claim:
1. The method which comprises reacting a cyclic phosphonite ester of the formula

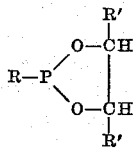

wherein R is selected from the group consisting of alkyl, aryl, and alkaryl radicals having up to 8 carbon atoms, and each R' radical is selected from the group consisting of hydrogen, and alkyl radicals having from 1 to 6 carbon atoms with a catalyst selected from the group consisting of alkyl iodides and alkyl bromides and dibromoalkanes having from 1 to 6 carbon atoms, and chloride, bromide, and iodide salts of aluminum, tin, zinc, magnesium, iron, titanium, bismuth, antimony, and boron under anhydrous conditions, at a temperature of from about 20° C. to about 200° C. to form a polymeric material and hydrolyzing the resulting polymeric material to form a compound selected from the group consisting of a compound of the formula

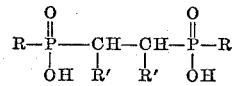

wherein R and R' are as defined above, and a salt thereof.

2. The method which comprises heating a 2-aryl-1,3,2-dioxaphospholane having from 6 to 8 carbon atoms in the aryl group to from about 100° C. to about 180° C. in the presence of aluminum chloride to form a polymeric material under anhydrous conditions, and hydrolyzing the resulting polymeric material to form a compound selected from the group consisting of a compound of the formula

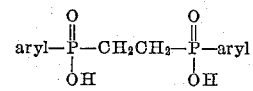

wherein aryl is as defined above, and a salt of such compound.

3. The method which comprises heating 2-phenyl-1,3,2-dioxaphospholane to from about 100° C. to about 180° C. in the presence of aluminum chloride under anhydrous conditions to form a polymeric material, and hydrolyzing the resulting polymeric material to obtain a compound selected from the group consisting of ethylene-1,2-bis-(phenylphosphinic acid) and a salt thereof.

4. The method which comprises heating 2-alkyl-4,4-dimethyl-1,3,2-dioxaphospholane having up to 8 carbon atoms in the alkyl group to from about 100° C. to about 180° C. in the presence of aluminum chloride under anhydrous conditions to form a polymeric material, and then hydrolyzing the resulting polymeric material to form a compound selected from the group consisting of 1,2-dialkyl-1,2-ethylenebis(alkylphosphinic acid) and a salt thereof where the alkyl is as defined above.

5. The method which comprises heating 2-ethyl-4,5-dimethyl-1,3,2-dioxaphospholane to from about 100° C. to about 180° C. in the presence of aluminum chloride under anhydrous conditions to form a polymeric material, and then hydrolyzing the resulting polymeric material to form a compound selected from the group consisting of 1,2-dimethyl-1,2-ethylenebis(ethylphosphinic acid) and a salt thereof.

No references cited.